(12) United States Patent
Tsuji

(10) Patent No.: US 7,670,160 B2
(45) Date of Patent: Mar. 2, 2010

(54) CARD CONNECTOR

(75) Inventor: Junya Tsuji, Tokyo (JP)

(73) Assignee: Tyco Electronics AMP K.K., Kanagawa-ken (JP)

( * ) Notice: Subject to any disclaimer, the term of this patent is extended or adjusted under 35 U.S.C. 154(b) by 307 days.

(21) Appl. No.: 11/813,976

(22) PCT Filed: Dec. 12, 2005

(86) PCT No.: PCT/JP2005/023192

§ 371 (c)(1),
(2), (4) Date: Jul. 13, 2007

(87) PCT Pub. No.: WO2006/075479

PCT Pub. Date: Jul. 20, 2006

(65) Prior Publication Data

US 2009/0035971 A1    Feb. 5, 2009

(30) Foreign Application Priority Data

Jan. 13, 2005    (JP)    ............................. 2005-005946

(51) Int. Cl.
*H01R 13/62*    (2006.01)
(52) U.S. Cl. .................................................... 439/159
(58) Field of Classification Search ................. 439/159, 439/160
See application file for complete search history.

(56) References Cited

U.S. PATENT DOCUMENTS

| | | | |
|---|---|---|---|
| 6,537,090 B2 | 3/2003 | Ozawa | |
| 6,929,490 B2 | 8/2005 | Kodera et al. | |
| 6,960,091 B2 * | 11/2005 | Matsunaga et al. | 439/159 |
| 6,976,860 B1 * | 12/2005 | Su | 439/159 |
| 7,070,430 B2 * | 7/2006 | Yang et al. | 439/159 |
| 7,083,446 B2 | 8/2006 | Tanaka et al. | |
| 7,131,853 B2 * | 11/2006 | Motojima | 439/159 |
| 7,309,245 B2 * | 12/2007 | Sadatoku et al. | 439/159 |
| 7,314,380 B2 * | 1/2008 | Kodera et al. | 439/159 |
| 7,467,959 B2 * | 12/2008 | Matsukawa et al. | 439/159 |
| 2001/0031571 A1 * | 10/2001 | Ito et al. | 439/159 |
| 2005/0101170 A1 * | 5/2005 | Tanaka et al. | 439/159 |
| 2005/0221649 A1 * | 10/2005 | Tanaka et al. | 439/159 |
| 2006/0003617 A1 * | 1/2006 | Motojima | 439/159 |
| 2007/0037424 A1 | 2/2007 | Matsukawa et al. | |

FOREIGN PATENT DOCUMENTS

| | | |
|---|---|---|
| JP | 2001291553 | 10/2001 |
| JP | 2004119148 | 4/2004 |
| JP | 2004178903 | 6/2004 |
| WO | 2004063972 A1 | 7/2004 |

* cited by examiner

*Primary Examiner*—Gary F. Paumen
(74) *Attorney, Agent, or Firm*—Barley Snyder LLC

(57) ABSTRACT

A card connector, comprising a housing having a card insertion slot, a contact carried by the housing, a slider carried by the housing and disposed substantially coplanar with the card insertion slot, the slider comprising a cam groove and a lock spring disposed substantially adjacent the lock spring, and a positioning member carried by the housing and being movable within the cam groove is disclosed.

20 Claims, 9 Drawing Sheets

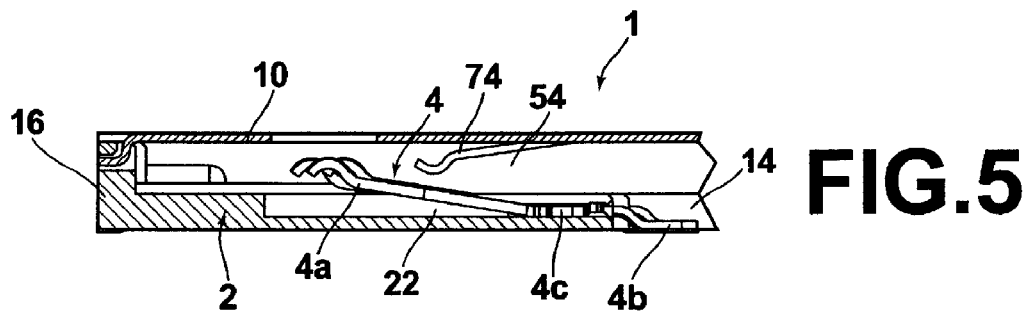
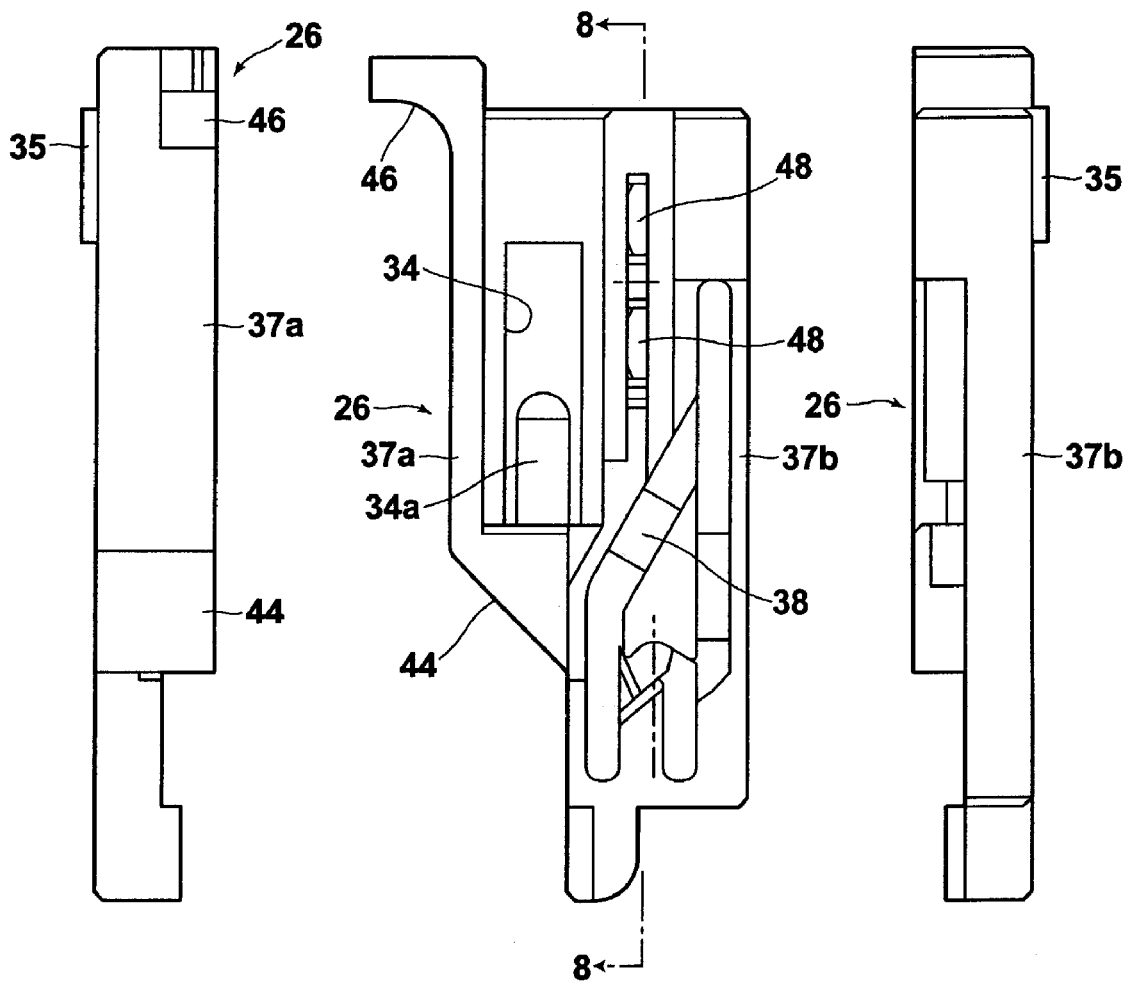

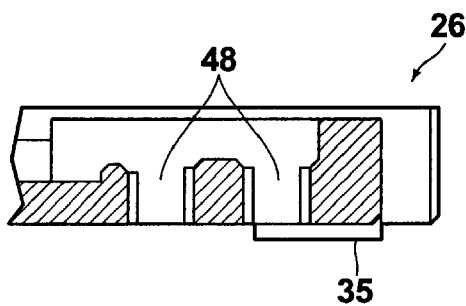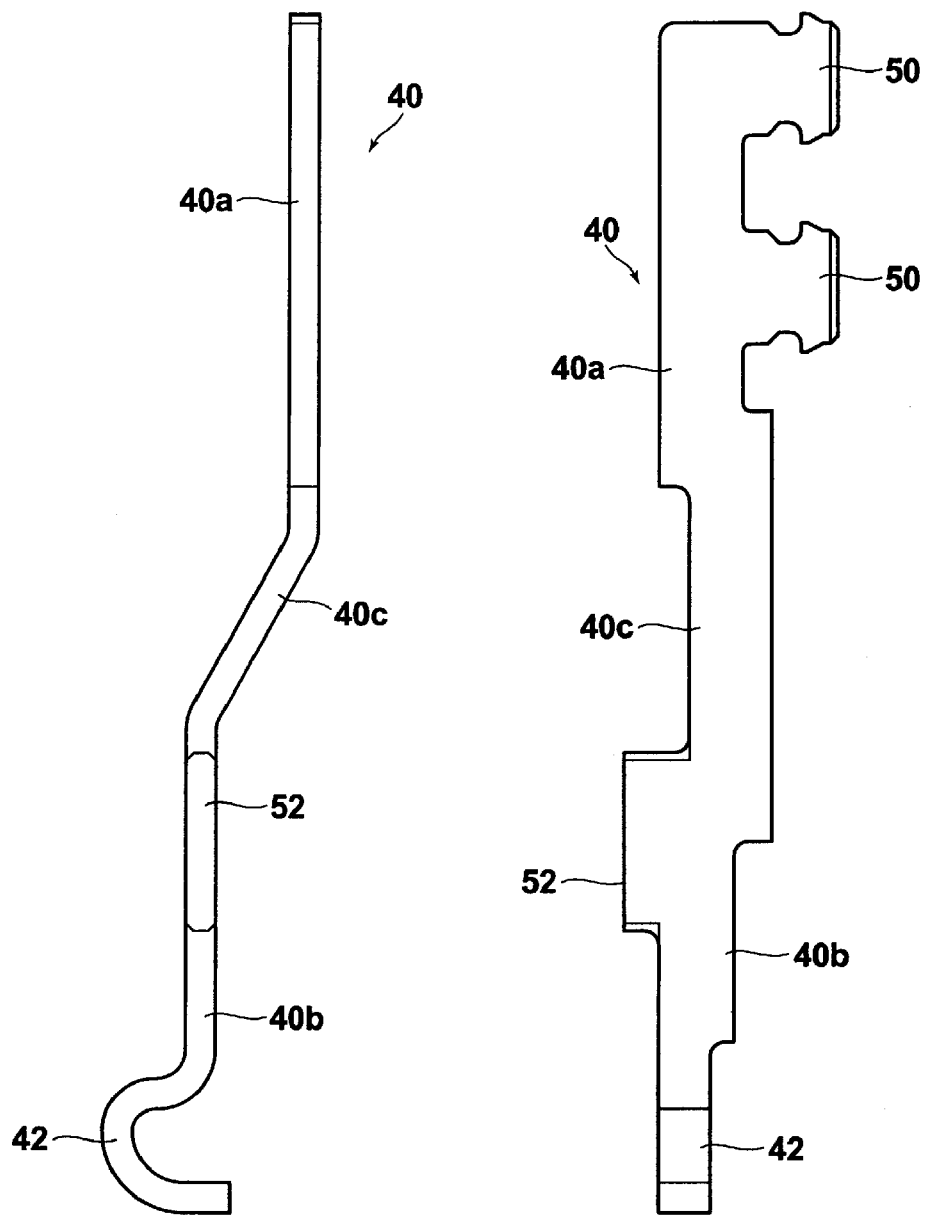

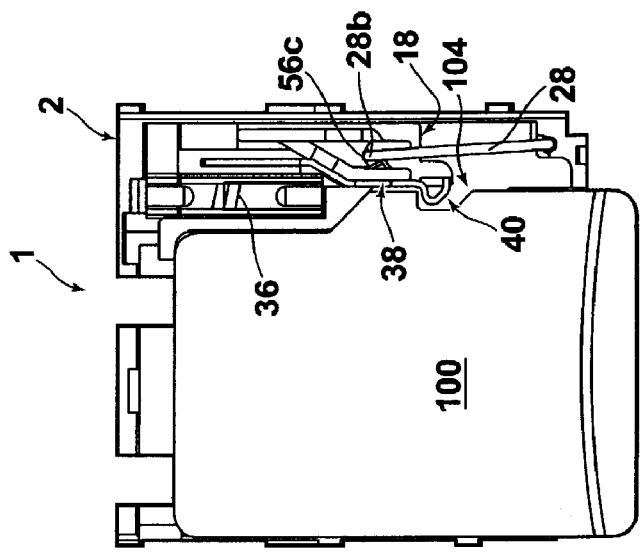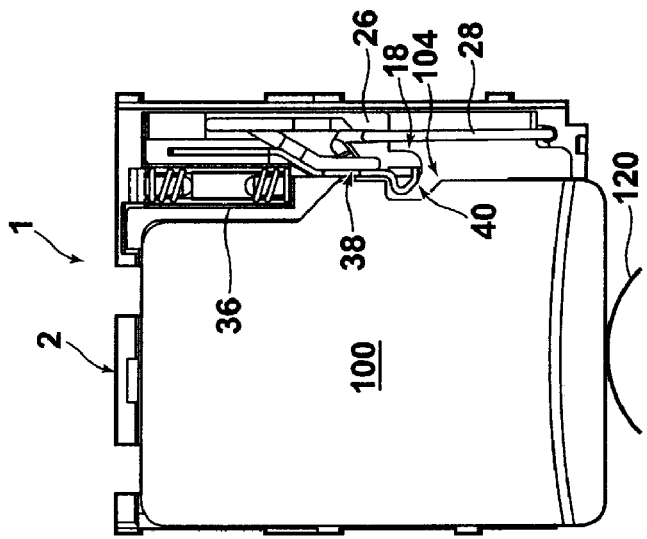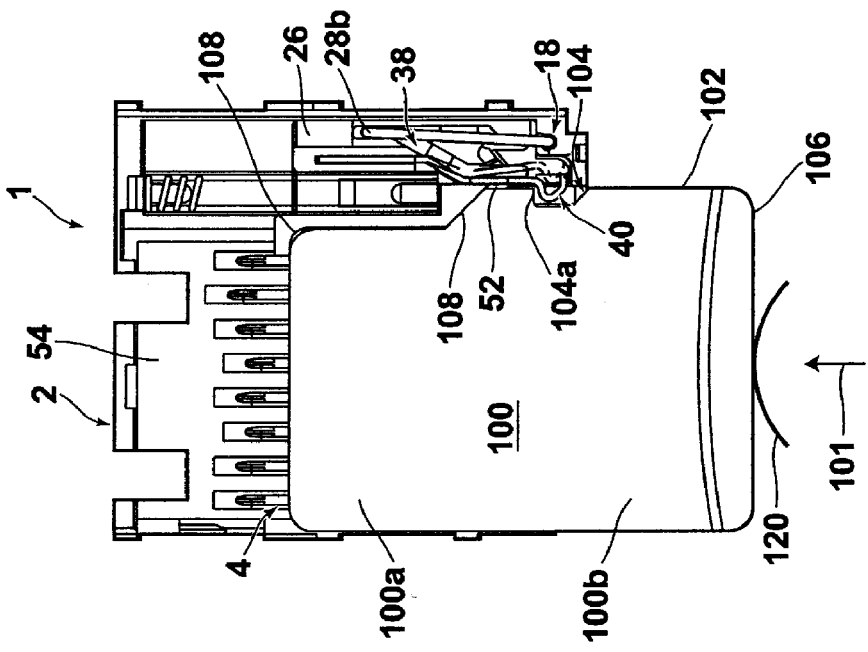

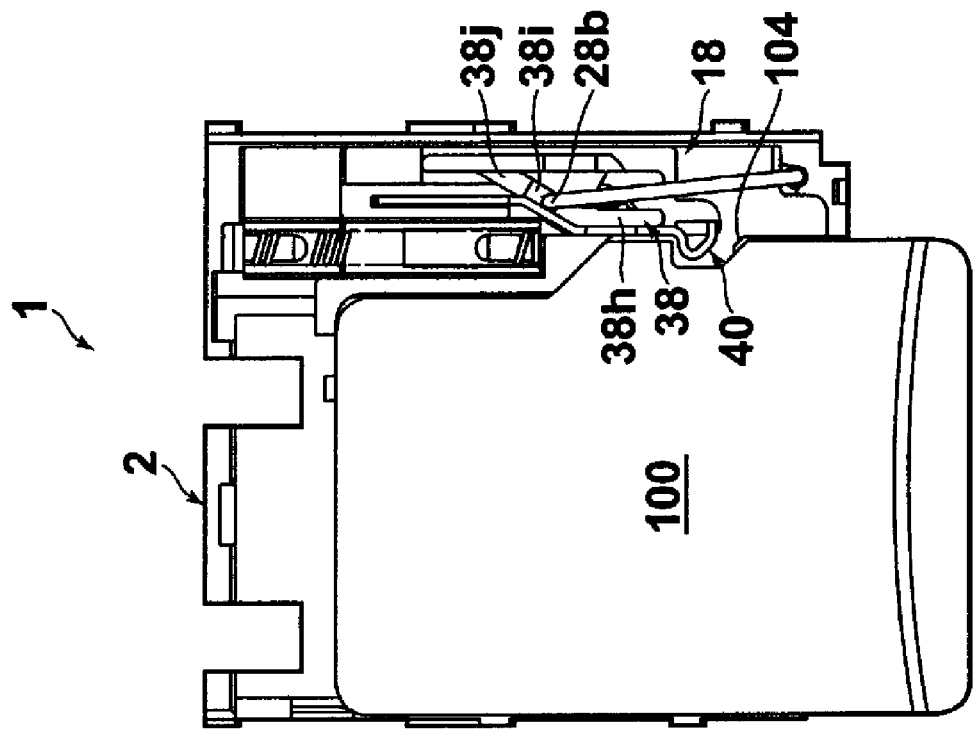
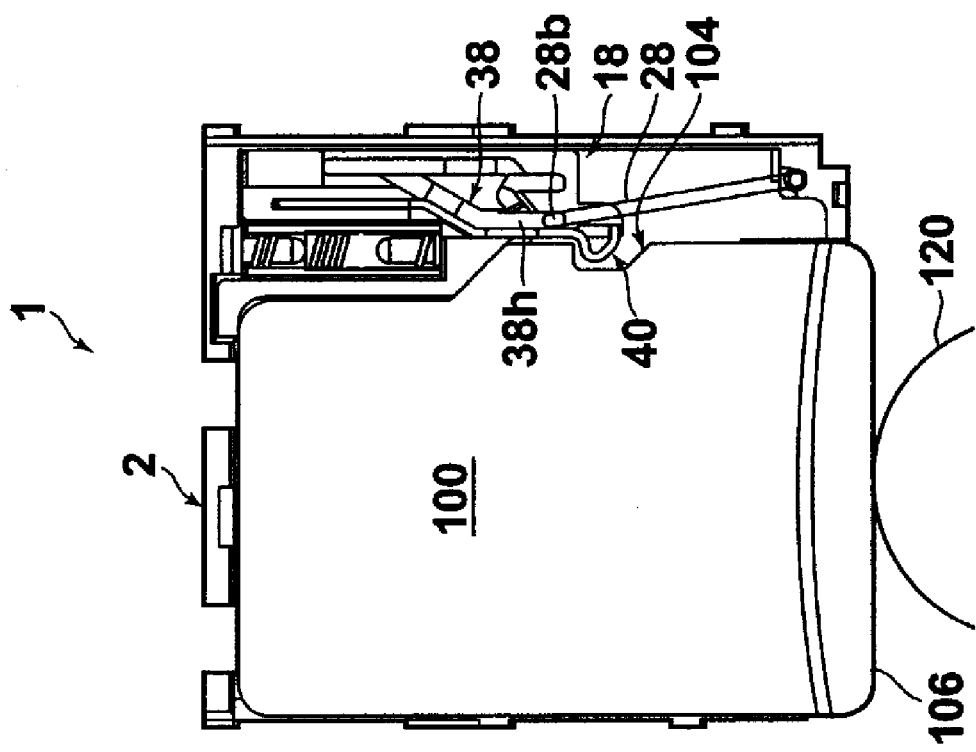

CARD CONNECTOR

CROSS-REFERENCE TO RELATED APPLICATION DATA

This application claims the benefit of the earlier filed parent international application number PCT/JP2005/023192 having an international filing date of Dec. 12, 2005 that claims the benefit of JP2005-5946 having a filing date of Jan. 13, 2005.

FIELD OF THE INVENTION

The present invention relates to a card connector, and more specifically, to a card connector having a cam mechanism capable of holding a card in a usable or ejectable position by a push operation of the card.

BACKGROUND

Various types of card connectors for use with personal computers, digital cameras, and the like are known. As an example of such connectors, a card connector that comprises an insulative housing having a terminal, a metal shell mounted on the housing and defining a card receiving space with a top plate and a pair of side plates hanging from both edges of the top plate, and a heart cam groove provided along a lower portion of one of the sides of the card receiving space is known as described, for example, in Japanese Unexamined Patent Publication No. 2004-327149 (FIGS. 1 and 14).

Another known device, a connector device for memory card that comprises a contact block having a heart cam groove on one end thereof, a slider that moves within the connector body in the forward-backward directions, and a lock metal having a lock piece that engages in the guide groove of the heart cam groove is known as described, for example, in Japanese Unexamined Patent Publication No. 2004-207168 (FIG. 1).

Stiff another known device, a card connector that comprises a housing having a contact held therein and a heart-shaped cam groove, and a slider provided in the housing such that it slides along the card insertion-removal directions is known as described, for example, in Japanese Unexamined Patent Publication No. 2001-291553 (FIGS. 6, 8, and 11).

Recently, card connectors for use with cell phones other than the applications described above, which may detachably hold a card for recording downloaded music or an image obtained by a cell phone camera, are demanded. A cell phone, however, comprises many electrical and electronic parts, so that it is necessary to make the card connector extremely compact and thin in order to be incorporated in the cell phone. In the card connector disclosed in Japanese Unexamined Patent Publication No. 2004-327149, the heart cam groove is provided on the surface of the cam slider which is orthogonal to the principal surface of the card. Likewise, in the connector device disclosed in Japanese Unexamined Patent Publication No. 2004-207168, the heart cam groove is provided on the surface of the contact block (housing) which is orthogonal to the principal surface of the card. These heart cam groove and heart cam groove section have a closed loop and requires a certain width. Accordingly, these connectors have a problem that the size in the height direction inevitably becomes significant although the size in the width direction of the connector, i.e., the width direction of the card may be reduced.

In the mean time, in the card connector disclosed in Japanese Unexamined Patent Publication No. 2001-291553, the heart-shaped cam groove is provided on the surface of the housing (slider mounting section) which is parallel with the principal surface of the card, and the slider is formed so as to slide on the housing. The cam groove is formed in a shape such that the size of the connector in the width direction is reduced. In order to form the cam groove, however, the slider mounting section of the housing requires a certain thickness, and the thickness of the slider is added thereto, so that, in total, the thickness of the connector becomes significant.

The present invention has been developed in view of the circumstances described above, and it is an object of the present invention to provide a compact card connector with a reduced thickness.

SUMMARY

The invention relates to a card connector comprising a housing having a card insertion slot, a contact carried by the housing, a slider carried by the housing and disposed substantially coplanar with the card insertion slot, the slider comprising a cam groove and a lock spring disposed substantially adjacent the lock spring, and a positioning member carried by the housing and being movable within the cam groove.

BRIEF DESCRIPTION OF THE DRAWINGS

FIG. 5 is a partial cross-sectional view of the card connector taken along the line 5-5 in FIG. 1A;

FIG. 6A is a left side view of a slider used in the card connector illustrated in FIG. 1A;

FIG. 6B is a plan view of the slider used in the card connector illustrated in FIG. 1A;

FIG. 6C is a right side view of the slider used in the card connector illustrated in FIG. 1A;

FIG. 8 is a partial cross-sectional view of the slider taken along the line 8-8 in FIG. 6B;

FIG. 9A is a plan view of a lock spring used in the card connector;

FIG. 9B is a side view of the lock spring used in the card connector;

FIG. 11A is a plan view of the card connector with the shell being removed illustrating a state in which a card is inserted into the card connector, and the card and lock spring are provisionally engaged with each other;

FIG. 11B is a plan view of the card connector with the shell being removed, illustrating a state in which the card is inserted all the way into the card connector;

FIG. 11C is a plan view of the card connector with the shell being removed, illustrating a state in which a finger is removed from the inserted card and the card is usable;

FIG. 12A is a plan view of the card connector with the shell being removed, illustrating a state in which the card in the usable state is pushed again by a finger; and FIG. 12B is a plan view of the card connector with the shell being removed, illustrating that the card is pushed back to a position where the card is allowed to be pulled out.

DETAILED DESCRIPTION OF THE EMBODIMENT(S)

Figure 1A:
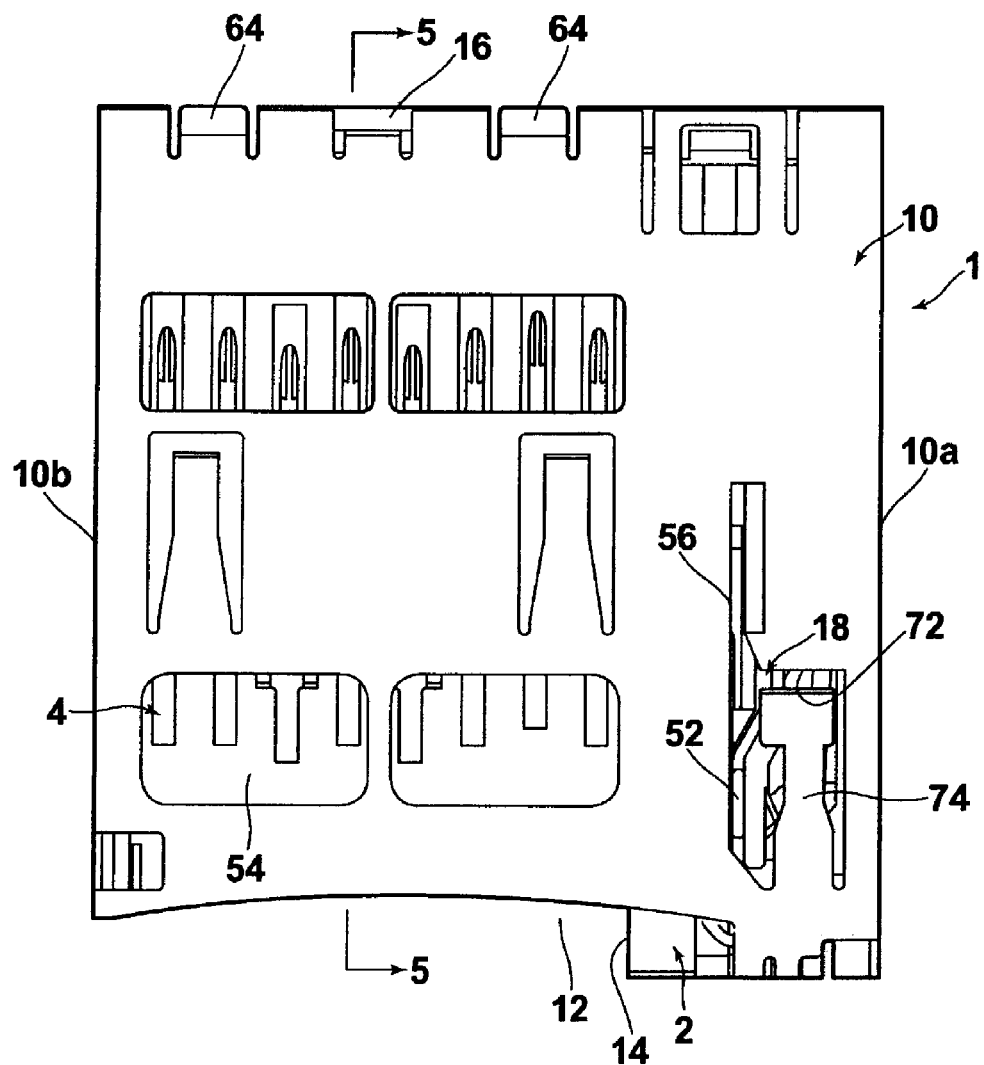
FIG. 1A is a plan view of a card connector which is an example of the present invention.

Hereinafter, an exemplary embodiment of the card connector of the present invention will be described with reference to the accompanying drawings. The card connector 1 comprises an insulative housing 2, contacts 4 held by the housing 2, and a metal shell 10 covering the housing upper face 6 and first and second housing side faces 8a, 8b of the housing 2.

Figure 1B:
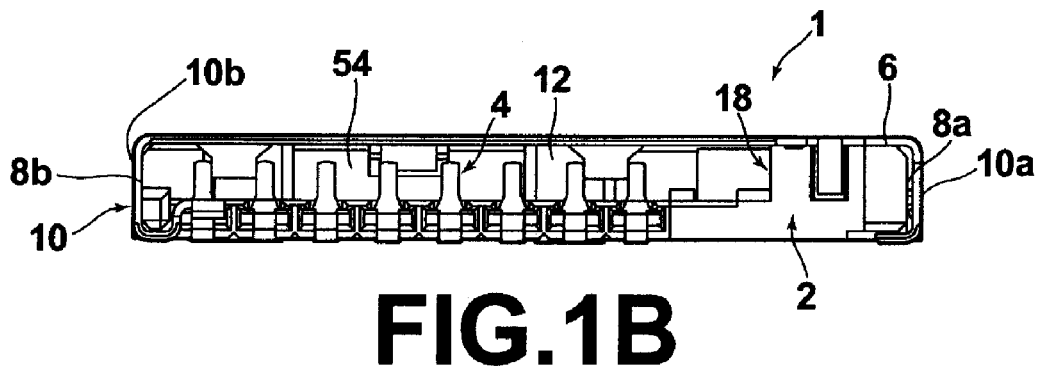
FIG. 1B is a front view of the card connector illustrated in FIG. 1A.
Figure 2A:
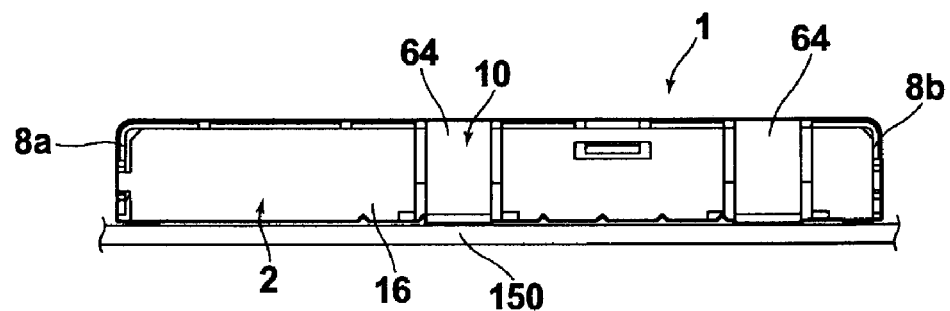
FIG. 2A is a rear view of the card connector illustrated in FIG. 1A.
Figure 2B:
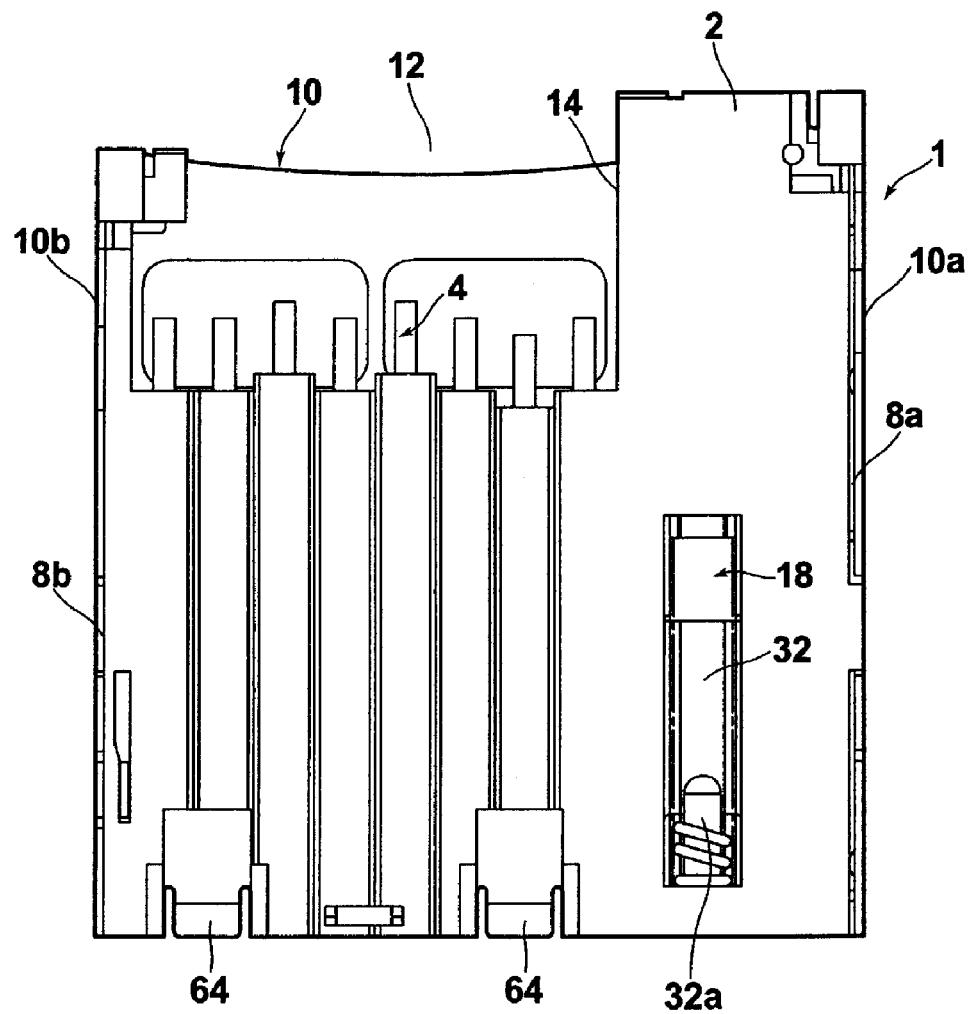
FIG. 2B is a bottom view of the card connector illustrated in FIG. 1A.
Figure 3A:
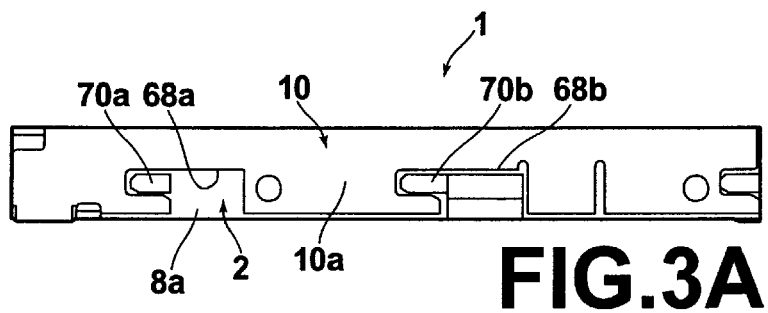
FIG. 3A is a right side view of the card connector illustrated in FIG. 1A.
Figure 3B:
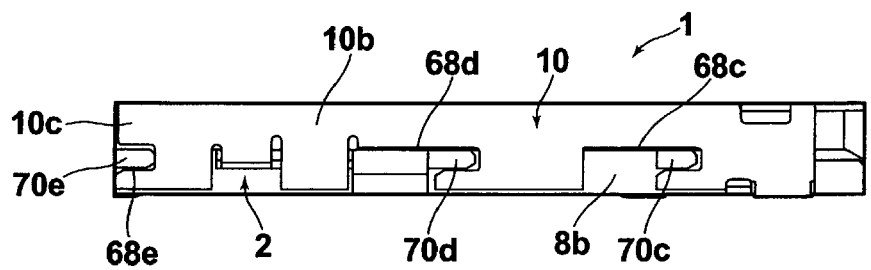
FIG. 3B is a left side view of the card connector illustrated in FIG. 1A.
Figure 4:
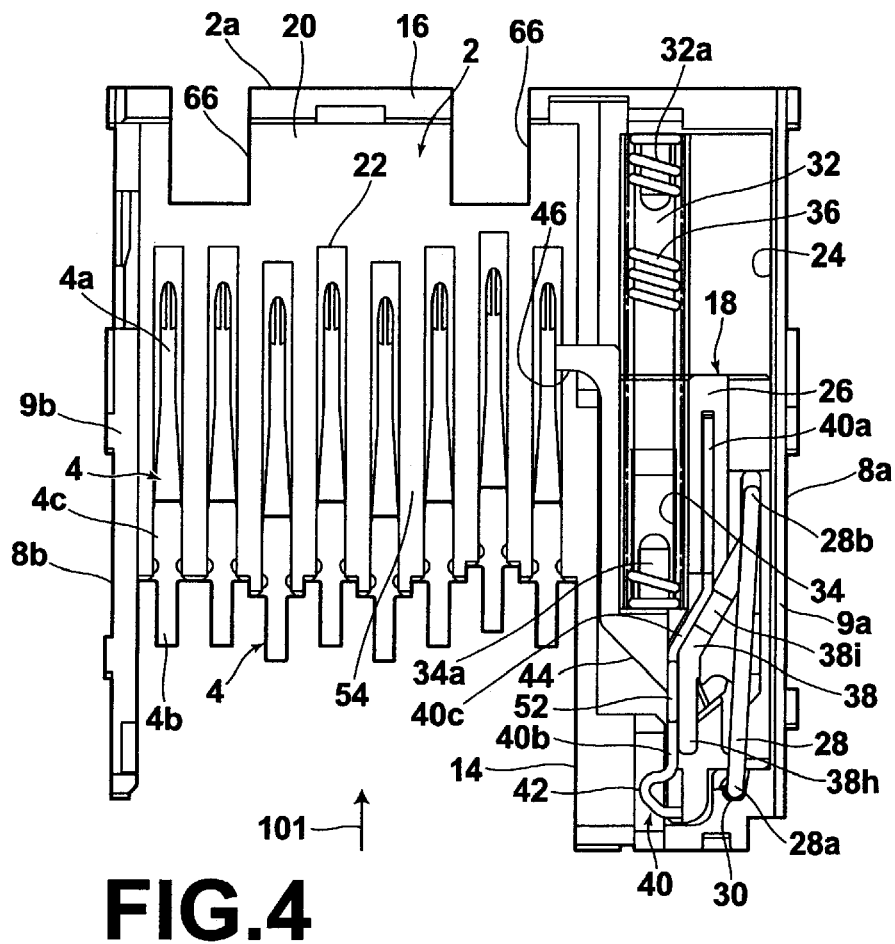
FIG. 4 is a plan view of the card connector illustrated in FIG. 1A with the shell being removed, illustrating the housing thereof.
Figure 7A:
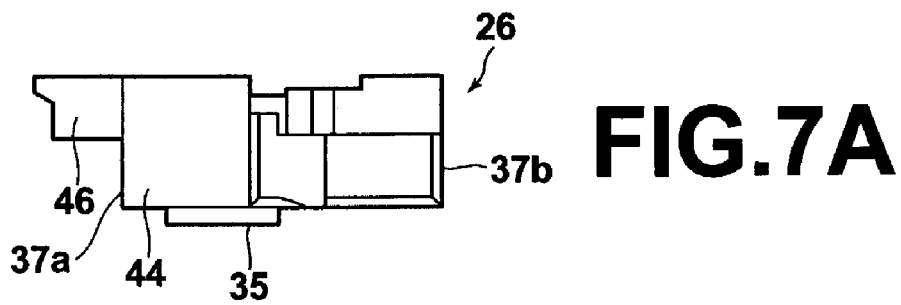
FIG. 7A is a front view of the slider illustrated in FIG. 6A.
Figure 7B:
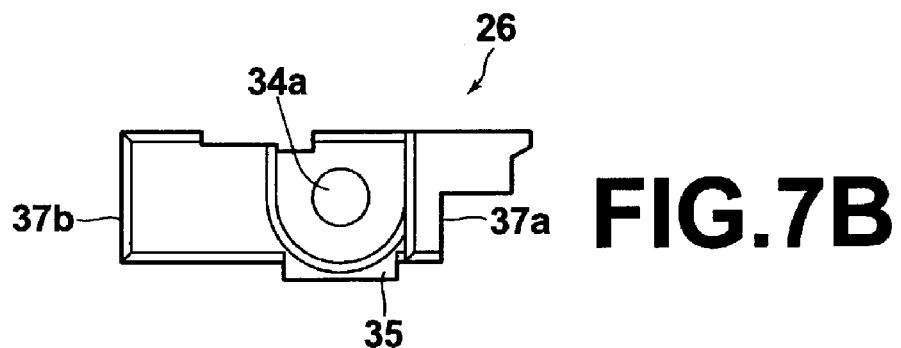
FIG. 7B is a rear view of the slider illustrated in FIG. 6A.
Figure 7C:
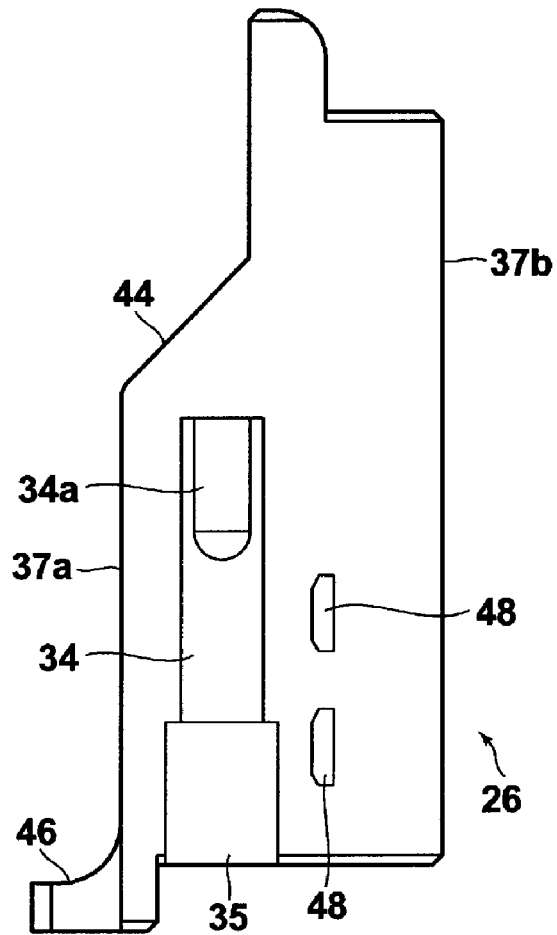
FIG. 7C is a bottom view of the slider illustrated in FIG. 6A.

First the shape of the housing 2 will be described with reference to FIG. 4, as well as FIGS. 1 to 3. FIG. 4 is a plan view of the housing 2 with the shell being removed. The housing 2 has substantially a rectangular planar shape, and comprises first and second housing side walls 9a, 9b, a housing rear wall 16, a housing bottom wall 20, and a cam mechanism 18 on the first housing side wall 9a. The area enclosed by the second housing side wall 9b, housing rear wall 16, housing bottom wall 20, and cam mechanism 18 forms a card receiving section 54 (FIGS. 1A, 1B, and 4). The housing 2 has a rectangular housing notch 14 on the side of a card insertion slot 12 (FIGS. 1A, 1B). The cam mechanism 18 on the right side has a relatively wide width, while the housing second side wall 9b on the left side has a relatively thin width as illustrated in FIG. 4. The housing notch 14 is formed so as to open toward the front side between the housing second side wall 9b and cam mechanism 18. The term "front side" as used herein means a side from where a card 100 (FIGS. 11A to 12B) is inserted, and of the terms "right" and "left" mean right and left, respectively, on a plan view of the card connector 1, as illustrated in FIG. 1A or 4. A plurality of contact insertion grooves 22 extending backward from the housing notch 14 are provided on the interior face of the housing bottom wall 20, i.e. on the bottom face. The plurality of contact insertion grooves 22 is formed in parallel along the insertion direction 101 (FIG. 4) of the card 100. Each contact insertion groove 22 comprises therein a single contact 4. Further, two rear notches 66 are formed on the housing rear end 2a (FIG. 4) of the housing 2.

The shell 10 mounted on the housing 2 constructed in the manner as described above is formed of a single metal plate through punching and folding. The shell 10 comprises first and second shell side walls 10a, 10b, respectively, that substantially cover the first and second housing side walls 9a, 9b of the housing 2 respectively, and an attachment piece 64 which is folded at the two rear notches 66 of the housing 2. When the card connector 1 is attached to a substrate 150 (FIG. 2A), the attachment piece 64 is soldered to the substrate 150. The first and second shell side walls 10a, 10b of the shell 10 have first and second L-shaped notches 68a, 68b, and third and fourth L-shaped notches 68c, 68d respectively, as illustrated in FIGS. 3A, 3B. The first and second side faces 8a, 8b of the housing 2 have first and second protrusions 70a, 70b, and third and fourth protrusions 70c, 70d respectively, which correspond to the first, second, third, and fourth notches 68a, 68b, 68c, and 68d, respectively. Note that the first, second, third, and fourth notches 68a, 68b, 68c, and 68d are collectively called the L-shaped notches 68, and first, second, third, and fourth protrusions 70a, 70b, 70c, and 70d are collectively called the protrusions 70. The protrusions 70 and notches 68 engage with each other to prevent the shell 10 from moving upward and rearward. As illustrated in FIG. 3B, the shell 10 has a rear side notch 68e, which is open toward the rear side, at the side wall rear end 10c of the side wall 10b, which engages with a corresponding rear protrusion 70e of the housing 2 and prevents the shell 10 from sliding out in the rear direction.

Further, the shell 10 has an opening 72 at a position corresponding to the cam mechanism 18, as illustrated in FIG. 1A. The opening 72 comprises an elastic tongue 74 extending backward from the front edge of the opening 72 and biased toward inside of the shell 10 (rearward in FIG. 1A). Further, a slot 56 extending backward following the opening 72 is formed. The elastic tongue 74 and slot 56 operate in cooperation with the cam mechanism 18, the details of which will be described later.

Next, the mounting state of the contacts 4 in the housing 2 will be described with reference also to FIG. 5. A press fitting section 4c of each contact 4 is press-fitted in each contact insertion groove 22, and thereby each contact 4 is attached to the housing 2. Each contact 4 comprises a contact segment 4a located in rear portion of the housing 2 and a tine 4b soldered to the substrate 150 (FIG. 2A) that protrudes into the housing notch 14. The contact segment 4a is inclined and located in the card receiving section 54. FIG. 5 clearly shows that the elastic tongue 74 is biased toward the inside of the shell 10.

Next, the cam mechanism 18 will be described with reference also to FIGS. 6A to 8. As illustrated in FIG. 4, the cam mechanism 18 comprises a slider 26 that slides in forward-backward directions within a broad groove 24 which is formed in the housing 2 and extending in the forward-backward direction. A first end 28a of a metal positioning member 28 with both ends bent in parallel is swingably inserted in a hole 30 formed in a direction orthogonal to the housing bottom wall 20 at the front end portion of the housing 2. The positioning member 28 is pressed toward the hole 30 and toward the cam groove 38 by the elastic tongue 74 of the shell 10, and thereby the positioning member 28 is prevented from exiting the hole 30. A forward channel 32 extending in the forward-backward direction is formed in the rear side of the groove 24 of the housing 2. A forward oriented first columnar protrusion 32a is formed at the rear end of the forward channel 32. A compression coil spring 36 is disposed between the first and second columnar protrusions 32a and 34a in a compressed state, and the slider 26 is constantly urged in the forward direction, i.e., the ejection direction of the card 100. In the mean time, the slider 26 comprises a backward oriented backward channel 34 aligned with the forward channel 32, and the backward oriented second columnar protrusion 34a is formed at the front edge of the backward channel 34.

The slider 26 comprises first and second side faces 37a, 37b, which are slidably brought into contact with the groove 24 of the housing 2, and thereby the slider 26 moves within the groove 24 in the forward-backward directions. The slider 26 comprises a convex portion 35, which slides within the forward channel 32 of the housing 2, protrudingly formed at the rear bottom face thereof to ensure smooth sliding of the slider 26.

The slider 26 comprises a closed loop cam groove 38 between the first housing side wall 9a of the housing 2 (FIG. 4) forming the groove 24 and backward channel 34. The cam groove 38 will be described in detail later. The second end 28b of the positioning member 28 described above is disposed in the cam groove 38, and moves within the cam groove 38 along with the forward-backward movement of the slider 26. That is, the second end 28b functions as a cam follower. Further, a lock spring 40 is disposed between the cam groove 38 and opening 34 along and adjacent to the cam groove 38. In FIGS. 6A to 6C, and FIGS. 7A to 7C, the lock spring 40 is omitted for clarity.

The lock spring 40 will now be described with reference also to FIGS. 9A, 9B. The plate-like lock spring 40 integrally comprises a lock spring rear portion 40a, lock spring front portion (free end portion) 40b, and a lock spring transition portion 40c connecting the rear and front portions 40a, 40b. The lock spring rear portion 40a and lock spring front portion 40b are displaced with each other in the horizontal direction, but they are straight and parallel with each other in planar view. In the lock spring front portion 40b of the lock spring 40, a first lock protrusion 42 is formed by folding the plate material of the lock spring 40 inwardly so as to swell outwardly. In the lock spring rear portion (fixing end) 40a, a pair of downwardly protruding tabs 50, 50 is provided, which is press fitted to the housing 2. In the mean time, a second lock protrusion 52, which is protruding upward, is provided in the lock spring front portion 40b adjacent to the lock spring transition portion 40c. The second lock protrusion 52 is placed at the left end of the opening 72 of the shell 10 (FIG. 1) when the lock spring 40 is attached to the slider 26.

The lock spring rear portion 40a of the lock spring 40 is fixed in fixing holes 48 (FIG. 6B) and front portion thereof is a free end portion (FIG. 4). The inwardly oriented first lock protrusion 42 of the lock spring front portion 40b is provided for locking the inserted card 100 (FIGS. 11A to 11C, and FIGS. 12A, 12B). When the lock spring 40 is fixed in the manner as described above, the lock spring front portion 40b and lock spring transition portion 40c are placed along and adjacent to the cam groove 38. The lock spring 40 has a function to guide the positioning member 28 moving in the cam groove 38 such that the second end 28b thereof does not exit the cam groove 38. In other words, lock spring 40 forms a portion of the wall of the cam groove 38. That is, the lock spring 40 is structured so as to be placed adjacent to a portion of the cam groove 38. Accordingly, the cam groove 38 may be formed shallow, and so may be the slider 26 by that amount. Inner face of the slider 26 comprises an inclined surface 44 along the outer shape of a card to be inserted and a forward oriented abutting surface 46 formed separately in the forward-backward direction. The inclined surface 44 is provided on the inner face of the slider 26 closer to the front end portion thereof, and the abutting surface 46 is provided on the inner surface of the slider 26 at the rear end portion thereof. The inserted card is abutted to the abutting surface 46 and moves the slider 26 backward while biasing the slider 26. When pushed by the card 100, the slider 26 constructed in the manner as described above moves backward along with the lock spring 40 and cam groove 38, while compressing the compression coil spring 36. This will be described in detail later.

Figure 10A:
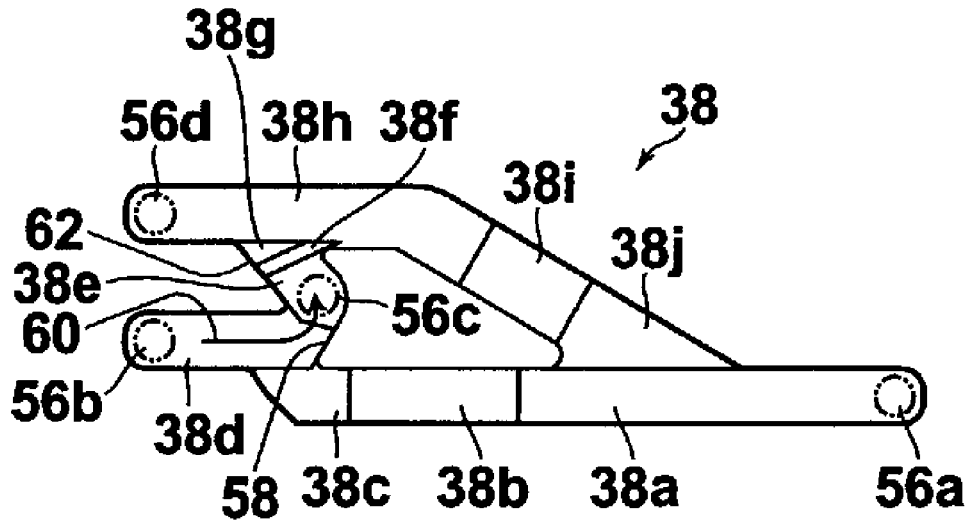
FIG. 10A is a plan view of a cam groove of the slider.
Figure 10B:
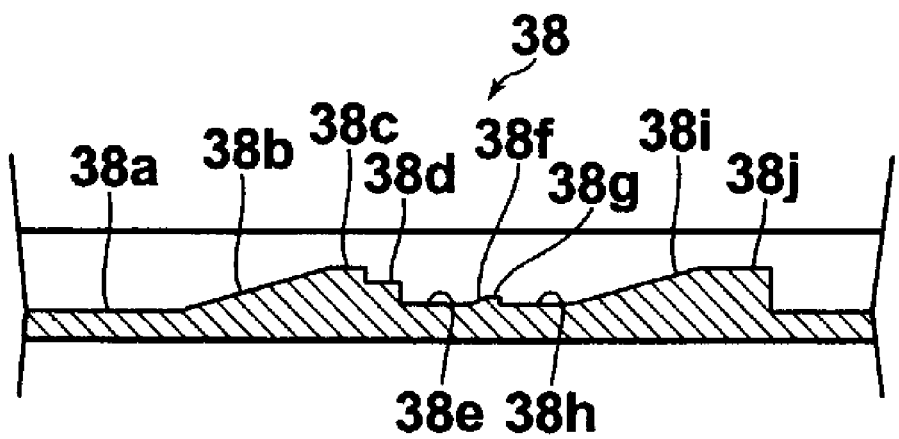
FIG. 10B is a development view of the cam groove of the slider.

Next, the cam groove 38 will be described with reference to FIGS. 10A, 10B. Roughly, the cam groove 38 has an elongated heart shape. The second end 28b of the positioning member 28 described above is disposed in the cam groove 38 and moves clockwise. For this reason, the cam groove 38 comprises a plurality of steps for preventing the reverse rotation. Hereinafter, the bottom shape of the cam groove 38 having the steps will be described.

The cam groove 38 comprises a lowest (deepest) first linear section 38a located in the back end, a first slope 38b rising from the first linear section 38a, and a first flat section 38c continuing from the top of the first slope 38b. These sections 38a, 38b, and 38c are on a straight line. The section 38c is followed by an inward section 38d which is displaced inwardly and lower than the section first flat section 38c by a step. The inward section 38d is located in the front end of the cam groove 38 and extends in the forward-backward direction in parallel with the first linear section 38a. The section inward section 38d is followed by a second flat section 38e which is lower than the inward section 38d through a step. The section second flat section 38e is followed by a second slope 38f rising from the second flat section 38e, and then by a third flat section 38g. The third flat section 38g is slightly higher than the section second flat section 38e. The third flat section 38g is followed by a fourth flat section 38h through a step. The fourth flat section 38h has the same height as the second flat section 38e. The fourth flat section 38h is followed by a rising third slope 38i, and then by a fifth flat section 38j. Then, from the fifth flat section 38j, the bottom shape of the cam groove 38 returns to the lowest first linear section 38a through a step.

In this way, the second end 28b of the positioning member 28 moves in the cam groove 38 clockwise from a high section to a low section and from a low section to a high section through a slope. Accordingly, the second end 28b of the positioning member 28 is movable only clockwise. If the second end 28b of the positioning member 28 tries to move counterclockwise, the movement is prevented by the steps of the cam groove 38. Further, the sections 38h, 38i, are guided by the lock spring front portion 40b and lock spring transition portion 40c of the lock spring 40 as illustrated in FIG. 4.

An operation of the cam mechanism 18, when the card 100 is inserted, for use, into the card connector 1 constructed in the manner as described above, will be described with reference to FIGS. 11A to 11C, and FIGS. 12A, 12B. Note that the shell 10 is omitted from these drawings. First, the shape of the card 100 will be described with reference to FIG. 11A. The card 100 has substantially a plate-like rectangular shape, with a narrow card front portion 100a and a broad card rear portion 100b, which is wider than the card front portion 100a. Here, the "front portion" means the fore side of the card 100 toward the card insertion direction 101, and "rear portion" means the side of the card 100 pushed by a finger. A notch-like lock concave portion 104 is formed on the side face 102 facing the cam mechanism 18 in the rear portion of the card 100. The lock concave portion 104 comprises a lock face 104a facing the rear end 106 of the card 100. Further, a slope 108 is formed on the card side face 102 as a transition portion between the card rear portion 100b and card front portion 100a. A corner 110 of the card 100 has a mutually complementary arc-shape with the abutting surface 46 of the slider 26 so as to abut to the arc-shaped abutting surface. In this way, the card 100 is formed in left-right asymmetric, and the slider 26 has a shape corresponding to the shape of the card 100, so that the card 100 can not be inserted into the card connector by reversing the left and right, and thereby erroneous insertion may be prevented.

When the card 100 formed in the manner as described above is inserted into the card insertion slot 12 (FIGS. 1A, 1B) of the card connector 1, the card front portion 100a of the card 100 is inserted into the card receiving section 54, and the lock spring 40 is deformed as illustrated by an imaginary line by running on the slope 108, then snaps back to the original shape at the position of the lock concave portion 104, thereby the first lock protrusion 42 engages with the lock concave portion 104, as illustrated in FIG. 11A. Here, the slider 26 is not moved yet, and the second lock protrusion 52 of the lock spring 40 is not moved into the slot 56 (FIG. 1A) of the shell 10. In this state, the lock spring 40 may bend outward as illustrated by an imaginary line. Thus, if the card 100 is pulled in the direction opposite to the insertion direction 101, the lock spring 40 is bent and the engagement is released, thereby the card may be pulled out. That is, the state illustrated in FIG. 11A may be referred to as a state in which the card 100 is provisionally locked. Here, the second end 28b of the positioning member 28 is located in a rear end position 56a of the first linear section 38a of the cam groove 38 (FIG. 10A).

Then, if the card 100 is inserted all the way into the card receiving section 54 by pushing the rear end of the card 100 with a finger, as illustrated in FIG. 11B, the slider 26 is pushed by the card 100, and moved to the rear portion of the card connector 1 against the elastic force of the compression coil spring 36. Here, the positional relationship between the lock spring and cam groove 38 is not changed from that illustrated in FIG. 11A. In the mean time, the second end 28b of the positioning member 28 is moved to a front end position 56b of the section 38d (FIG. 10A) through the first linear section 38a and first flat section 38c.

In this state, if a finger 120 is removed, the slider 26 is pushed back in the direction opposite to the insertion direction 101 by the elastic force of the compression coil spring 36, as illustrated in FIG. 11c. The second end 28b of the positioning member 28 is moved as illustrated by the arrow 60 (FIG. 10A) guided by the cam groove wall 58 of the cam groove 38, and stopped at the stopped position 56c. Here, an electrode (not shown) of the card 100 is brought into contact with the contact segment 4a of the contact 4, and thereby the card 100 is electrically connected to the card connector 1. That is, the card 100 becomes usable. Further, the second lock protrusion 52 of the lock spring 40 is placed in the slot 56 of the shell 10, so that the lock spring 40 is prevented from elastically deforming in the left-right directions. Accordingly, the engagement of the card 100 with the lock spring 40 is securely maintained.

Next, an operation of the cam mechanism 18, when the card 100 is removed from the card connector 1, will be described with reference to FIGS. 12A, 12B. As illustrated in FIG. 12A, when the card rear end 106 of the card 100 is pushed by the finger 120 again, the second end 28b of the positioning member 28 is moved to a position 56d of the fourth flat section 38h guided by the wall 62 (FIG. 10A). Then, if the finger 120 is removed from the card 100, the second end 28b of the positioning member 28 is returned to the first linear section 38a through the fourth flat section 38h, third slope 38i and fifth flat section 38j, as illustrated in FIG. 12B. FIG. 12B illustrates a state in which the second end 28b of the positioning member 28 is on its way back to the section first linear section 38a. At the final position of the second end 28b of the positioning member 28, i.e., at the rear end position 56a, the second lock protrusion 52 of the lock spring 40 exits the slot 56 and the lock spring 40 becomes bendable in the left-right directions, so that the card 100 may be pulled out.

Here, an important fact is that when the second end 28b of the positioning member 28 moves along the rear end portion of the fourth flat section 38h and the third slope 38i, which form an angle with the insertion direction 101 of the card 100, the longitudinal axis of the positioning member 28 forms a relatively large angle with these portions, but the second end 28b of the positioning member 28 does not exit the cam groove 38, since the second end 28b is guided by a planar face of the lock spring 40, as illustrated in FIGS. 12A, 12B. Further, the movement of the positioning member 28 is not hindered by the lock spring 40 even though the positioning member 28 and lock spring 40 are disposed in extremely close proximity with each other. Accordingly, the cam mechanism 18 may be formed narrow in width. Another important fact is that the cam mechanism 38 and lock spring 40 are incorporated in the slider 26, and the card 100 and slider 26 lie within substantially the same plane. This allows the thickness of the housing 2 to be reduced, and thereby the height of the card connector 1 may be reduced.

What is claimed is:

1. A card connector, comprising:
   a housing having a card insertion slot;
   a contact carried by the housing;
   a slider carried by the housing and disposed substantially coplanar with the card insertion slot, the slider comprising a cam groove and a lock spring disposed substantially adjacent the cam groove; and
   a positioning member carried by the housing and being movable within the cam groove.

2. The card connector according to claim 1, wherein the slider is movable in an insertion-removal direction of a card configured for insertion into and removal from the card insertion slot.

3. The card connector according to claim 1, wherein the cam groove is formed as a closed loop.

4. The card connector according to claim 1, wherein the positioning member is moved within the cam groove in reaction to movement of a card within the card insertion slot.

5. The card connector according to claim 1, wherein when the positioning member is in a rear end position within the cam groove, a card is provisionally locked within the card insertion slot.

6. The card connector according to claim 1, wherein when the positioning member is in a front end position within the cam groove, the slider is located in a rear portion of the card connector.

7. The card connector according to claim 1, wherein when the positioning member is in a stopped position within the cam groove, the contact is electrically connected to an electrode of a card within the card insertion slot and the card is usable.

8. The card connector according to claim 1, further comprising:
   a shell that substantially covers the housing and cam mechanism, the shell having an elastic tongue for biasing the positioning member toward the cam groove.

9. The card connector according to claim 1, further comprising:
   a shell having a slot extending in an insertion-removal direction of a card configured for insertion into and removal from the card insertion slot; and
   a second lock protrusion formed on the lock spring;
   wherein when the second lock protrusion is located within the slot, the lock spring is prevented from elastically deforming in a left-right direction.

10. A card connector, comprising:
    a housing having a card insertion slot;
    a contact carried by the housing;
    a slider carried by the housing and disposed substantially coplanar with the card insertion slot, the slider comprising a cam groove and a lock spring disposed substantially adjacent the cam groove, and the slider being movable in reaction to the relative movement of a card within the card insertion slot along an insertion-removal direction; and
    a positioning member carried by the housing and being movable within the cam groove.

11. The card connector according to claim 10, wherein the slider is movable in an insertion-removal direction of the card when the card is moved in the insertion-removal direction.

12. The card connector according to claim 10, wherein the cam groove is formed as a closed loop.

13. The card connector according to claim 10, wherein the positioning member is moved within the cam groove in reaction to pushing the card into the card insertion slot.

14. The card connector according to claim 10, wherein when the positioning member is in a rear end position within the cam groove, a card is provisionally locked within the card insertion slot in reaction to pushing the card.

15. The card connector according to claim 10, wherein when the positioning member is in a front end position within the cam groove, the slider is located in a rear portion of the card connector in reaction to pushing the card.

16. The card connector according to claim 10, wherein when the positioning member is in a stopped position within the cam groove, the contact is electrically connected to an electrode of a card within the card insertion slot and the card is usable in reaction to pushing the card.

17. The card connector according to claim 10, further comprising:

a shell that substantially covers the housing and cam mechanism, the shell having an elastic tongue for biasing the positioning member toward the cam groove.

18. The card connector according to claim 10, further comprising:

a shell having a slot extending in the insertion-removal direction; and a second lock protrusion formed on the lock spring;

wherein when the second lock protrusion is located within the slot, the lock spring is prevented from elastically deforming in a left-right direction.

19. The card connector according to claim 10, wherein the slider is biased to eject the card from the card insertion slot.

20. The card connector according to claim 10, wherein a first end of the positioning member is rotatably retained within a hole.

* * * * *